United States Patent [19]
Polyak

[11] Patent Number: 4,632,435
[45] Date of Patent: Dec. 30, 1986

[54] TUBING CONNECTOR SYSTEM

[75] Inventor: Mark Polyak, Minnetonka, Minn.

[73] Assignee: American Medical Systems, Inc., Minnetonka, Minn.

[21] Appl. No.: 686,980

[22] Filed: Dec. 27, 1984

[51] Int. Cl.⁴ .............................................. F16L 33/22
[52] U.S. Cl. .................................... 285/243; 285/319; 285/331; 285/179; 285/157; 285/423; 285/921; 285/39
[58] Field of Search ............... 285/242, 179, 243, 157, 285/244, 423, 921, 317, 39, 319, 323, 331

[56] References Cited

U.S. PATENT DOCUMENTS

| | | | |
|---|---|---|---|
| 3,711,125 | 1/1973 | Dehar | 285/319 X |
| 3,999,783 | 12/1976 | Legris | 285/243 |
| 4,005,884 | 2/1977 | Drori | 285/323 |
| 4,266,814 | 5/1981 | Gallagher | 285/319 |
| 4,293,149 | 8/1981 | Bonel | 285/111 |
| 4,462,622 | 7/1984 | Barzuza | 285/DIG. 22 |
| 4,537,183 | 8/1985 | Fogarty | 285/DIG. 22 |

FOREIGN PATENT DOCUMENTS

| | | | |
|---|---|---|---|
| 388859 | 3/1933 | United Kingdom | 285/323 |
| 2016914 | 7/1981 | United Kingdom | 285/323 |

OTHER PUBLICATIONS

Mentor Corporation brochure.

*Primary Examiner*—Dave W. Arola
*Attorney, Agent, or Firm*—Arnold, White & Durkee

[57] ABSTRACT

A tubing connector system particularly suitable for use with medical prostheses is disclosed. The system involves of a connector assembly and a connector assembly tool. The connector assembly is composed of a clamping ring and connector body which can be coupled together to connect two lengths of tubing. The connector assembly grips the tubing by compression, advantageously forming an outwardly flared tubing end portion that aids in retaining the tubing within the connector assembly. The connector assembly tool possesses jaws designed to receive and hold the connector assembly members in a nested relation as the tool closes, joining the connector assembly members.

16 Claims, 7 Drawing Figures

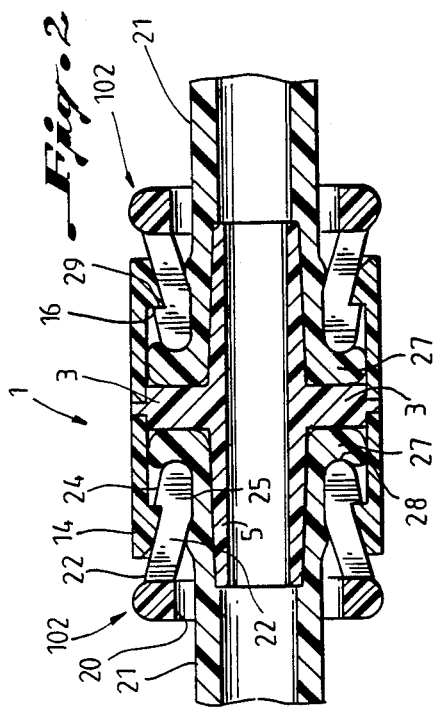
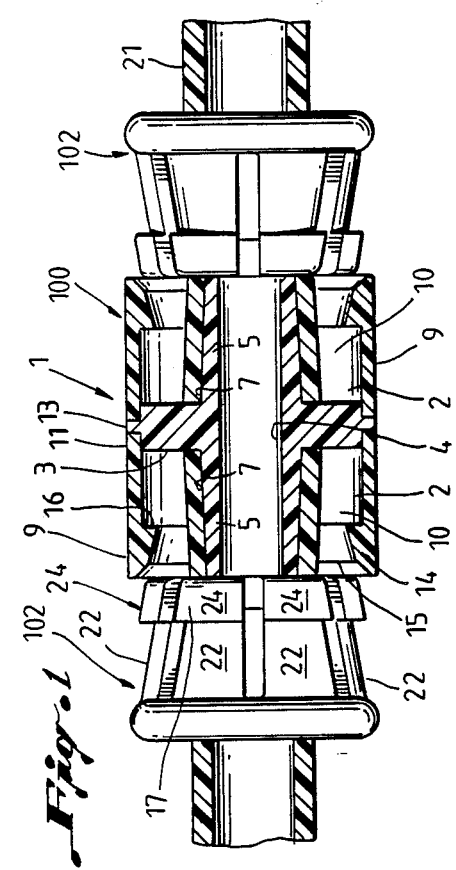
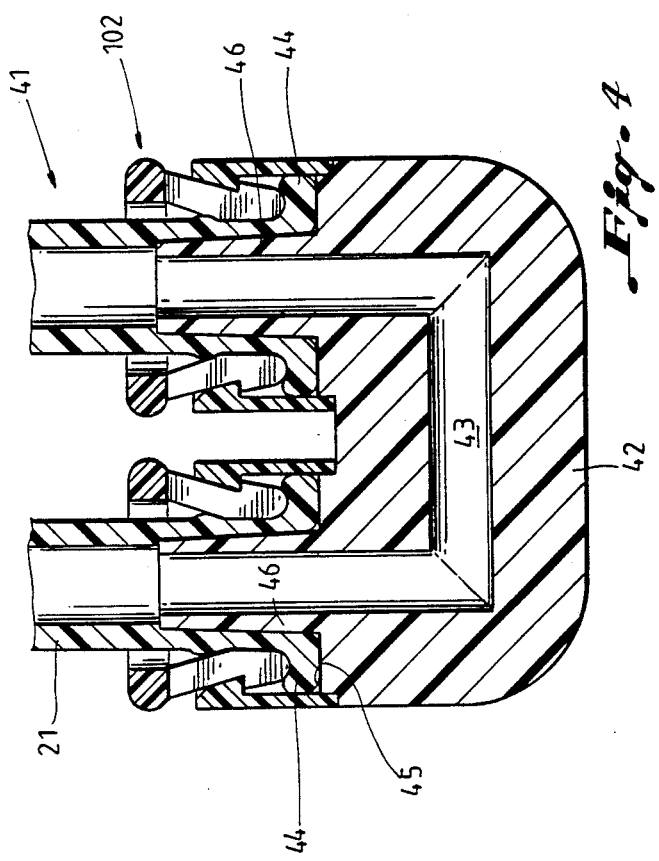
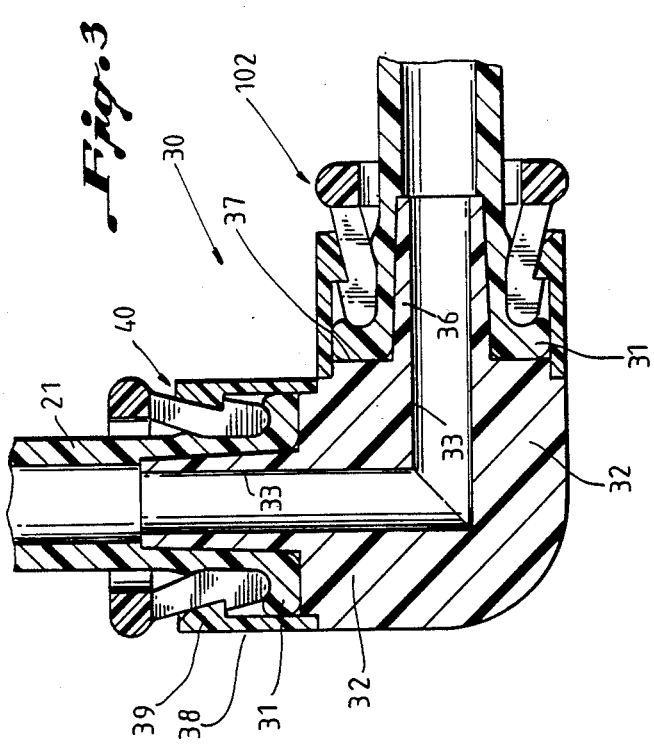

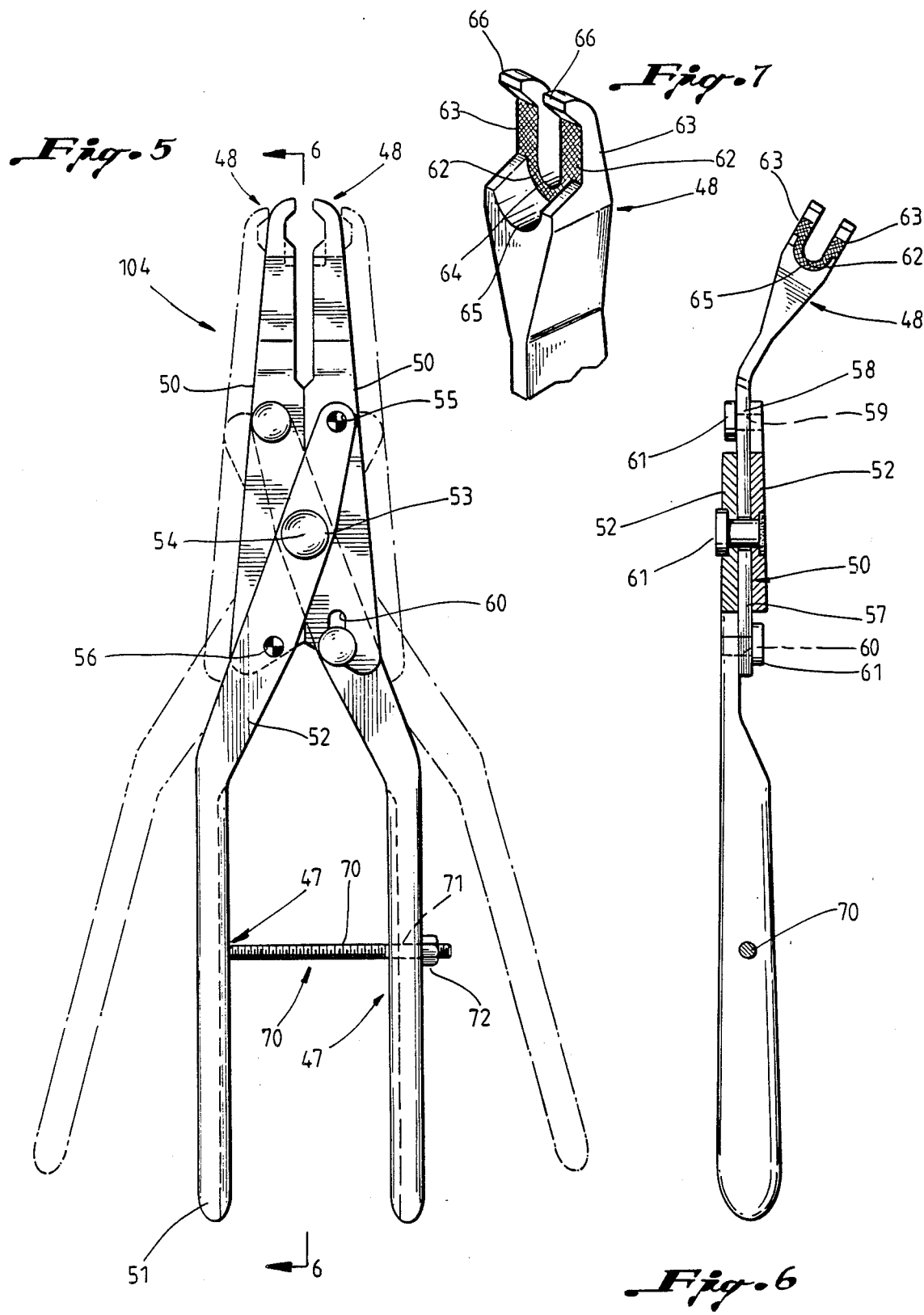

TUBING CONNECTOR SYSTEM

BACKGROUND OF THE INVENTION

1. Field of the Invention

The present invention concerns a system for connecting flexible tubing, piping and similar conduits. In one aspect, the invention relates to a system of couplings, elbows, and other fittings for use with such conduits. In another aspect, it relates to special tools for connecting the fittings with such conduits. The invention has particular application in connecting together lengths of plastic tubing, especially for medical purposes.

2. Description of the Background Art

In the field of medicine, plastic tubing is in common use for various purposes. One such purpose lies in transferring fluids to or from the human body, or directly within the body. Another purpose lies in the operation of prosthetic devices such as penile prostheses. In all such uses, it is generally necessary to use special connectors or fittings to connect lengths of tubing together, to connect tubings to fittings, etc. It is also generally necessary and desirable that the connections be easy to make, that they be made quickly, and that they be reliable. This is especially true when the tubing and connectors are used directly within the human body.

Silicone tubing has found extensive application in this type of service, because of its outstanding compatability with the human body. Silicone tubing, however, must be handled with care. In particular, it has been observed that this type of tubing has a tendency to fail if overstretched or subjected to sharp corners or deformed such that its tensile yield strength is exceeded.

Mechanical couplings and similar fittings are finding increasing use in medicine to connect lengths of tubing. Sutures have also been employed, but sutures in general are less convenient to use than mechanical fittings.

One type of mechanical connector is currently available for use in penile prostheses. The connector consists of a doubly conical, hollow male member and a cylindrical female member which snaps onto the male member. The snapping action is effected by a plurality of inward facing, flexible claws on the female member which slide over and grab a conical, annular, angularly protruding flange on the male member. To connect two pieces of tubing with this particular connector, the two pieces of tubing are connected to opposite ends of a coupling. At each end of the coupling, the end of one piece of tubing is passed through an opening in the female member of the connector and then stretched over the male member until it extends past and around the flange on the male member. When the claws on the female member are pushed over the flange on the male member, the claws spring inwardly and trap the tubing in position between the claws and the flange on the male member. In other words, the female member acts as a clip to lock the tubing against the male member.

While the currently available connector mentioned above offers certain advantages over sutures, it has a potential weakness when used with certain types of tubing such as silicone tubing. Since the tubing is overstretched about the male member it may be subject to failure in tension. This is particularly possible at the angularly protruding flange where the tubing is stretched and bent most severely. Moreover the currently available connector mentioned above may not be amenable with use with reinforced tubing. With tubing having reinforcing strands such as nylon or dacron reinforcing strands, the stretching of the tubing over the male member and the bending that may occur at the angularly protruding flange may cause fiber separation and ultimately tubing failure.

Soft flexible tubing, such as silicone and reinforced silicone tubing, has a tendency to neck inwardly when subjected to axial stretching forces. With the connector system described above, this inwardly necking tends to help the tubing pull loose from the connector.

SUMMARY OF THE INVENTION

It is a feature of the present invention to enable connections between plastic conduits, notably lengths of silicone tubing, with reduced prospects of failure, consistent connecting holding force and ease of making positive connection. The invention comprises a connector which includes a clamping ring and a connector body. The connector body has a cylindrical portion with an annular opening designed to receive a tubing end as well as the finger end of the collet-type clamping ring. Each finger or prong of the clamping ring is resiliently flexible and terminates in a tip or flange which extends radially outward relative to the longitudinal axis of the ring.

The annular opening of the connector body of the present connector is defined by an outer conduit or tubular member and a coaxial inner conduit or tubular member. The outer tubular conduit terminates in a flange which extends radially inward to a position spaced from the inner tubular conduit. Fluid flow through the connector body is restricted to the inner tubular conduit by a partition or wall which blocks flow through the annular space between the inner and outer tubular conduits.

The connector body and clamping rings of the present connector are configured to enable the end of a length of tubing to pass through a central longitudinal opening in each clamping ring. This same end of the tubing then fits snugly over one end of the inner tubular conduit of the connector body, conveniently until the tubing butts up against the partition or wall in the annular space. The prongs of the clamping ring, which face toward the connector body, are sufficiently flexible to be compressed around the tubing and pushed through the annular entrance of the connector body until they pass the inwardly directed flanges of the connector body. Once past the flanges, the prongs have sufficient resilience to expand and lock their tips against the interior surface of the flange. Meanwhile, the inner radial surfaces of the prongs press firmly against the outer surface of the tubing and lock the tubing in place.

The present invention enables the formation of a radially outwardly flared tubing end portion that further constributes to the locking action of the connector system. Moreover the outward flaring of the tubing end portion is aided by the radially inwardly directed compression of the tubing produced with the present invention. This compression makes the tubing rigid at the point of compression which controls the tendency of the tubing to extrude out of the connector.

As will become more apparent in the following description of the present invention, the connectors of the invention are easy and quick to use, and they provide reliable connections without sacrificing tubing integrity. The compressive forces between the connector and the tubing are distributed to control contact with sharp edges. The connectors may be fabricated from a variety of materials, including plastics suitable for medical prosthetics. The connectors of the invention may be used as parts of couplings, elbows, U-bends, valves and other fittings.

Another aspect of the invention lies in a tool which is suited for use in making up the connectors of the invention. The tool makes use of a U-shaped jaw whose legs are spaced sufficiently to straddle the tubing but not the connector. Thus, the face of the jaw can be placed around the tubing and up against the back of a clamping ring through which the tubing passes. The face of the jaw is also recessed or contoured to define a saddle or nest to receive and fit against the appropriate surface of the body of an elbow, valve or other fitting to be connected to the tubing. Thus, a tool of the invention may be designed and employed for connecting two lengths of tubing to opposite ends of a coupling, or a single length of tubing to a variety of fittings.

The jaws of the invention may be attached to and operated by a variety of linkages. A pliers-like linkage has been found satisfactory, especially one in which one handle of the pliers is capable of moving longitudinally as well as laterally relative to the other handle. As will become more apparent later in this description, this type of tool enables a pair of jaws to approach and depart from one another along a substantially linear rather then arcuate path.

Another aspect of the invention lies in a method of connecting flexible tubing. The method includes the step of pushing the tubing onto a tubular member within a connector housing. The tubing is compressed against the tubular member to firmly retain the tubing within the connector housing. An outwardly flared tubing end portion is formed inwardly within the connector housing with respect to where the tubing is compressed against the tubular member. Advantageously, the outwardly flared tubing end portion is formed as the tubing is pushed nto the connector housing.

DESCRIPTION OF THE DRAWINGS

FIG. 1 is a partially sectioned sideview of an embodiment of a straight line connector or coupling of the invention prior to engagement.

FIG. 2 is a completely sectioned sideview of an embodiment of a straight line connector or coupling in engagement.

FIG. 3 is a sectional sideview of an embodiment of an elbow connector.

FIG. 4 is a sectional sideview of an embodiment of a U-shaped connector.

FIG. 5 is a front view of an embodiment of the connector assembly tool of the invention.

FIG. 6 is a partially sectioned sideview of an embodiment of the connector assembly tool of FIG. 5.

FIG. 7 is a perspective view of an embodiment of one of the jaws of the connector assembly tool of FIG. 5.

DETAILED DESCRIPTION AND PREFERRED EMBODIMENTS

The present invention is a tubing connector system comprised of a connector assembly and a connector assembly tool.

Connector Assembly

The connector assembly comprises two components or members: a connector body and a clamping ring. Each member may be fabricated as an integral entity or from two or more subcomponents. Thus, the connector body may include an axially extending passageway that extends completely through the connector body. At each end of the passageway, a tubular connecting portion is attached to the connector body to provide a continuous passageway, beginning at the entrance of the connecting portion and extending through the passageway of the connector body. A sleeve surrounds each connecting portion to define an annular space between the sleeve and the connecting portion. The inner end of each sleeve is joined around its periphery to the connector body. The outer end of each sleeve terminates in an inwardly facing flange. The flange defines with its connecting portion an annular passageway between the flange and the connecting portion. The inside end of the flange is adapted to catch the end of an outwardly directed flange of the below described clamping ring of the connector assembly.

The clamping ring is positionable at the outer end of each connecting portion of the connector body. The clamping ring is adapted to allow a length of tubing to pass through a passageway within the ring. After the tubing has passed through the ring, the tubing may be pushed onto the connecting portion of the connector body. The clamping ring possesses a plurality of elastic, flexible prongs distributed around the end of the ring facing the connecting portion of the connector body. On each prong, at the end facing the connector body, is an outwardly facing flange or tip. The prongs are flexible enough to be insertable through an annular passageway defined between the flange of the connector body and the connecting portion of the connector body.

After the tubing has been passed through the clamping ring and stretched onto the connecting portion of the connector body, the ring is slid along the tubing toward the connector body. The flange of the connector body compresses the prongs of the ring, as the prongs enter the annular passageway between the flange and the connecting portion of the connector body. After the outwardly facing flanges of the ring prongs pass the end of the inwardly facing flange of the connector body, the prongs expand outward to lock the flanges of the ring prongs behind the flange of the connector body.

With the present invention a sure connection may be achieved without damaging or weaking the tubing. Because it is unnecessary to stretch the tubing over the connector body, the possibility of overstretching or causing stress risers is reduced. Moreover, since the tubing is locked in compression, the tubing becomes hard at the point of locking connection, overcoming the tendency of the tubing to neck inwardly under tension and to extrude outwardly from the point of connection. In addition since the tubing may be caused to flare radially outwardly, inwardly of the point of connection, an added locking effect may be attained by the outwardly flared tubing end portions.

The connectors of the invention may be made of a variety of materials, depending in part on the service to which they are to be put. In general, the material in any given case should be compatible with the fluids to be handled. The material should also have the resilience and strength necessary to enable the connectors to snap into engagement and then maintain such engagement. When the connectors are used in medical prostheses, it is important that the material be biocompatible—i.e., compatible with the parts or functions of the body to which they are exposed. Acetal resins and polysulphones are considered suitable for use in protheses.

A preferred embodiment of a coupling or straight line connector using the present connector assemblies is shown in FIGS. 1 and 2. The straight line connector 1 is cylindrical and includes two clamping rings 102 and a connector body 100 defining two compartments 2 separated by a transverse partition 3. A circular passageway 4 extends through the partition 3 from one compartment to the other compartment. Each compartment contains an inner tubular member 5 joined to the transverse partition 3 to produce a concentric passageway extending from one end of one tubular member 5 in one compartment 2 through the partition passageway 4 and extending through the other tubular member 5 in the opposite compartment 2. The outer wall 7 of each inner tubular member 5 gradually increases in thickness from its outer end to the partition 3.

A tubular sleeve 9 is coaxial with and surrounds each inner tubular member 65 to define an annular space 10 between each sleeve 9 and its inner tubular member 5. The inner end 11 of each sleeve 9 may be joined to the other sleeve at the partition 3. While the sleeves 9 may be formed integrally with the remainder of the body 100, the sleeves 9 may also be formed separately of the rest of the connector body 100 and joined to a central tab 13 on the periphery of the partition 3, by conventional bonding techniques such as adhesive or thermal bonding. The outer end of each sleeve 9 terminates in an inwardly facing annular flange 14. Each flange 14 defines with each inner tubular member 5 an annular passgeway 15 leading to the annular space 10 between the sleeve 9 and its respective inner tubular member 5. The inside edge 16 of each flange is adapted to provide a catch for the plurality of outwardly facing flanges or tips 24 of the resilient, discrete, curved prongs 22 of the clamping ring 102. The outer edge 17 of each flange 24 is inclined inwardly to define a camming surface.

Referring to FIG. 2, each clamping ring 102 may comprise a collet positionable at the outer end of an inner tubular member 5 of the connector body 100. Each ring 102 contains a hollow center 20 adapted to encircle a length of flexible tubing 21.

Two lengths of tubing 21 can be connected using the present connector assembly as follows. Each length of tubing 21 is passed through a clamping ring 102 and pushed over a separate inner tubular member 5 of the connector body 100. Each clamping ring 102 is slid toward the connector body 100. Each flange 14 of the connector body 100 cams the prongs 22 of a clamping ring 102 radially inwardly, as the clamping ring 102 is coupled with the connector body 100. As the prongs 22 are deflected, the inside surface 25 of each prong engages the outside wall of the tubing 21 that has been pushed over an inner tubular member of the connector body 100 with a predetermined compressive force.

As the prongs 22 further penetrate the annular passageways 15 between the inner tubular members 5 and the sleeves 9 of the connector body 100, the prongs 22 force each tubing 21 into contact with the partition 3 of the connector body 100. As each clamping ring 102 locks with the connector body 100, a formed flange of tubing or a radially outwardly flared tubing end portion 27 is formed between the prong ends 28 and the partition 3 of the connector body 100.

The compressive action of the clamping ring 102 forces more tubing 21 into the connector body 100 than can be accomodated along the inner tubular members so that the end portions 27 becomes flared outwardly as they abut with the partition 3. After the ends 29 of the outwardly facing flanges 24 of the collet prongs 22 pass the ends 16 of the inwardly facing flange 14 of the sleeves 9 of the connector body, the prongs 22 spring outwardly and lock the flanges of the collet prongs 24 behind the flanges 14 of the sleeves 9 of the connector body 100.

Each section of tubing 21 is secured to an inner tubular member 5 of the connector body 100 because of the compressive force exerted upon the tubing 21 by the prongs 22 of the clamping rings 102 against the outer wall of the tubing. The outwardly flared tubing end portion 27 between the prong ends 28 of each clamping ring 102 and the partition 3 of the connector body 100 also helps secure each tubing 21 to its respective inner tubular member 5 of the connector body 100.

Referring specifically to FIG. 1, each female clamping ring 102 is shown outside the connector body 1. In FIG. 2 each clamping ring 102 is shown in section and fully engaged with the connector body 100.

Referring next to FIG. 3, the elbow connector 30 includes two compartments 31 oriented at substantially a right angle to each other. Each compartment 31 is attached to a body member 32 having a passageway 33 extending through the body member 32. The passageway 33 is shown to bend at substantially a right angle within the housing of the body member 32. Passageway 33 may also be curved. Inner tubular members 36 are attached to the body member 32 on separate faces 37 of the body member 32. Each inner tubular member 36 is located in relation with the passageway 33 of the body member 32 to produce a passageway which extends through one inner tubular member 36, bends at substantially a right angle within the body member 32, and continues to extend through the body member and into the inner tubular member 36 attached to the adjacent face 37 of the body member 32 to which the other inner tubular member 36 is attached. The inner tubular members 36 of the elbow connector are essentially identical to the inner tubular members 5 of the straight line connector of FIGS. 1 and 2. Sleeves 38, similar to the sleeves 9 of the straight line connector, surround the inner tubular members 36 of the elbow connector 30 in the same way as the sleeves 9 surround the inner tubular members 5 in the straight line connector. The inwardly directed flange 39 at the end of each sleeve 38 defines with its respective inner tubular member 36 the same type of annular passageway 40 that is present in the straight line connector. Further, each clamping ring 102 of the elbow connector 30 is essentially identical to the clamping rings 102 of the straight line connector.

Referring next to FIG. 4, the U-shaped connector 41 includes a body member 42 containing a U-shaped passageway 43, and two essentially side-by-side compartments 44 attached on the same face 45 of the body member 42. The compartments 44 of the U-shaped connector 41 are essentially identical to the connecting compartments 31 of the elbow of FIG. 3 and of the straight line connector of FIGS. 1 and 2. The inner tubular members 46 of the connecting compartments 44 of the U-shaped connector 41 are attached to the same face 45 of the body member 42 such that a continuous passageway extends from one inner tubular member 46, through the body member passageway 43, and into the other inner tubular member 46. The tubing 21 is attached to the inner tubular members 46 of the U-shaped connector 41 in the same way as the tubing 21 is attached to the inner tubular members of the elbow in FIG. 3 and of the straight line connector in FIGS. 1 and 2. The clamping ring 102 of the U-shaped connector 41 is identical to the clamping rings 102 of FIGS. 1-3. Coupling between the body member 42 and clamping rings 102 of the U-shaped connector assembly is achieved in the same manner as coupling was achieved in the elbow and straight line connector assemblies of FIGS. 1-3.

Additional modifications, arrangements, and embodiments of the connector assembly disclosed by the present invention will readily occur to those skilled in the art. The invention in its broader aspects is therefore not limited to the specific details, representative apparatus, and the illustrative preferred embodiments shown and described above. Accordingly, departures may be made from the detail without departing from the spirit or scope of the disclosed general inventive concept.

Connector Assembly Tool

The connector assembly tool of the invention may be used to couple the clamping rings and connector body of the above disclosed connector assemblies. The tool comprises a pair of jaws that firmly support a connector assembly. A mechanism interconnecting the jaw members is operated to enable the jaws to be moved toward one another, pushing the connector body and clamping rings together.

The jaws of the tool may be attached to and operated by a variety of linkages. In a pliers-like linkage, containing pivotally joined handle members the action of the handles may be altered to vary the manner in which the jaws approach each other. For example, if the handles pivot about a single point and each handle is composed of a single piece, the jaws approach each other along arcuate paths. Alternatively, if each handle is composed of more than a single piece, a linkage assembly may be designed to produce a closing motion in which the jaws approach each other along substantially linear paths. In general, the more linear the paths, the more likely it is that the jaws will make up the connectors of the invention without misalignments or other mishaps.

A preferred form of jaw comprises two prongs or legs spaced sufficiently to straddle a length of tubing, but not the connector. Thus, the face of the jaw can be placed around the tubing and up against a clamping ring through which tubing is passed. The face of the jaw is also recessed or contoured to define a saddle or nest adapted to receive and fit against the appropriate surface of the body of an elbow, valve or other fitting to be connected to the tubing. In other words, the shape of the jaw face should conform to the contours of the connector to insure firm support of the connector. Preferably, the end of each jaw is tipped as shown in FIG. 7 to engage the end of a fitting, such as an elbow, when tubing is joined to such a fitting.

As shown in FIG. 5, the connector assembly tool 104 comprises four main parts: a pair of handles 47 and a pair of linkage members 50 each with a jaw 48. Each handle 47 in turn, comprises a grasping end 51 and a linkage end 52 angularly oriented with respect to one another so that the linkage ends 52 of the two handles 42 across one another. A pivot pin 53 pivotally joins the two handles 47 at a pivot point 54 intermediate their ends. Each handle 47 defines a separate first pivot hole 55 through the linkage end 52 and a separate second pivot hole 56 between the point 54 and the grasping end 51. The pivot holes 55 and 56 extend substantially transversely to the plane of movement of the handles 47 about the pivot 54.

An adjustable stop 70 penetrates through a hole 71 in one of the grasping ends 51. The stop 70 may consist of a threaded rod 70 which passes through a threaded hole 71 in the handle end 51. The stop 70 may be adjustably positioned and held by a lock nut 72.

The stop 70 may be used to vary the distance between the below described jaws 48 at their closed position. The closed position of the jaws 48 is fixed to reduce the danger of placing connectors and fittings under undesirable compressive forces. The stop 70 may also be used to indicate connector completion or closure. The below described linkage members 50 may also be shaped to help limit the extent to which the jaws may be closed.

The linkage members 50 are arranged on opposite lateral sides of the pivot point 54, sandwiched between the opposed handles 47. As shown in FIG. 6, each linkage member 50 has a handle end 57 and a jaw end 58. Each linkage member 50 defines a separate first pivot hole 59 between its ends 57, 58 which is in alignment with the first pivot hole 55 of a handle end 52. Each linkage member 50 also defines a separate slotted pivot hole 60 toward the handle end 57 of that same linkage member 50, which slot 60 is in alignment with the second pivot hole 56 of a linkage end 52 of a handle 47. Each slotted hole 60 extends longitudinally along its respective linkage member 50.

Four separate bushings 61 are fitted into each pair of holes 55, 59 and 56, 60 to enable pivoting movements of the linkage members 50 and the linkage ends 52 to occur about their respective bushings. The bushings 61 that are fitted in the slotted holes 60 further provide for sliding movements to occur between the linkage members 50 and their respective linkage ends 52.

A jaw 48, angled out of the plane of the rest of the tool 104, is attached to the jaw end 58 of each linkage member 50, as shown shown in FIGS. 6 and 7. Each jaw 48 possesses a pair of coplanar prongs 63 joined to form a U-shaped end 64 to the jaw 48. The prongs are spaced sufficiently to straddle a length of tubing, but not a connector, for example of the type shown in FIGS. 1-4. Thus, the u-shaped face 62 of the jaw can be placed around the tubing and up against a fitting such as a clamping ring through which the tubing passes. The jaw face 65 is recessed or contoured to define a saddle or nest to receive and hold from below a connector assembly. The jaw face 65 is designed such that a connector assembly will be held firmly while squeezing opposed connector assembly ends together with the connector assembly tool.

The tool 104 makes it possible to quickly and easily make up compression actuated or push-type connectors and to connect up tubing using the connectors. For example, when two lengths of tubing are to be connected by means of a fitting such as the coupling shown in FIGS. 1 and 2, one length of tubing is passed through a clamping ring 102 and over an inner tubular member 5 at one end of the coupling. The other length of tubing is similarly passed through another clamping ring and over the inner tubular member at the other end of the coupling. One jaw 48 of the tool 104 is then placed at one end of the coupling such that the prongs 63 of the jaw straddle the tubing at that end of the coupling. Also the u-shaped face 62 bears against the outer end of the clamping ring 102. The other jaw of the tool is similarly placed at the other end of the coupling. The handle grasping ends 51 are then squeezed together, causing the jaws 48 to approach each other along a common linear path, thereby urging the clamping rings 102 to enter both ends of the coupling and to lock into position within the coupling. In the process of locking, the rings 102 also lock the two lengths of tubing to the coupling.

When the tool is used to connect a length of tubing to one end of a fitting, such as the elbow shown in FIG. 3, the tubing is again passed through a clamping ring 102 and over the inner tubular member 36 at one end of the elbow. One jaw of the tool is then placed in position around the tubing and up against the clamping ring 102. The other jaw is positioned around a vertically aligned body 32 of the elbow while the other body 32 spans and nests on the faces 65. The tips 66 of one jaw 48 then overhang and restrain the outer edge of the vertically disposed connector body. The handle grasping ends 51 are then squeezed together to lock the clamping ring and the tubing to the elbow.

Prior to using the tool, the distance between the jaws 48 at their closed position should be checked to reduce the danger of placing connectors and fittings under undesirable compressive forces. As shown in FIG. 5, the linkage members 50 can be shaped to limit the extent to which the jaws can be closed. The adjustable stop 70 may also be used for this purpose.

The arrangement of the tool's linkages enables the jaws of the tool to approach and depart from one another along a substantially linear rather than a substantially arcuate path. As the handles 47 are pushed apart, bushings 61 move within the longitudinal slots 60 to convert the arcuate motion of the handles 47 into linear motion of the linkage members 50. Thus, the linkage members 50 are allowed to slip downwardly and outwardly simultaneously. Consequently, the jaws 48 are separated from one another along a substantially linear path as the handles are separated from one another. Similarly, as the grasping ends 51 of the handles 47 are pushed together, the bushings 61 move within the longitudinal slots toward the handle end of the linkage members, causing the linkage members to move together inwardly and upwardly simultaneously. This motion causes the jaws to be pushed toward one another along a substantially linear path as the grasping ends 51 are pushed towards one another. Thus, the members 50 move generally parallel to one another. This type of jaw movement greatly reduces misalignments and faulty connections when using the tool.

Although a particular embodiment of the tool of the invention has been disclosed and illustrated above, numerous modifications and alternative embodiments of the tool will be obvious to those skilled in the art in view of this description. For example, the shape of the jaws and their prongs may be altered to accommodate tubing and fittings of various shapes and sizes. The handles may also be embodied in a number of modified and alternative forms. For example, the handles may consist only of two single pieces pivotally joined at a point intermediate between the ends of each handle, thereby eliminating the linkage members from the above described embodiment. While this arrangement may not achieve all the advantages of the illustrated embodiment, it may be desirable in certain circumstances. Alternatively, the above described tool may consist of jaws attached to means interconnecting the jaws other than the above described pivotally joined handles. Accordingly, this description is to be construed as illustrative only and is provided for the purpose of teaching those skilled in the art the manner of constructing the connector assembly tool of the present invention.

What is claimed is:

1. A connector assembly for connecting to flexible tubing, said connector assembly comprising:
   (a) a connector body having a central passageway for fluids and a generally cylindrical portion arranged to engage the interior of said flexible tubing;
   (b) a clamping ring having inner and outer surfaces; said clamping ring having a passageway enabling said clamping ring to encircle said tubing and enabling said clamping ring to slide along said tubing, after said tubing has engaged said generally cylindrical portion of said connector body, until said inner surface of said clamping ring engages said tubing;
   said inner surface having a substantially blunt surface enabling said inner surface to apply a compressive force upon said tubing against said cylindrical portion once said inner surface has engaged said tubing, without causing said tubing to contact sharp edges; and
   (c) a securement device to engage the outer surface of said clamping ring and to secure said clamping ring to said connector body, said securing of said clamping ring to said connector body enabling said inner surface of said clamping ring to apply said compressive force to said tubing causing said tubing to be clamped onto said generally cylindrical portion; said clamping ring insertable between said connector body and said securement device allowing said connector assembly to be arranged to enable a substantially linear compressive force, applied substantially parallel to the longitudinal axis of said generally cylindrical portion, to engage said clamping ring to said connector body and said securement device.

2. The connector assembly of claim 1 wherein said securement device includes an outer tubular portion concentric about and connected to said cylindrical portion.

3. The connector assembly of claim 2 wherein said cylindrical portion increases in cross-section as it extends inwardly into said connector body.

4. The connector assembly of claim 2 wherein said clamping ring is in the form of a collet with a plurality of fingers adapted to releasably lock on the inside surface of said outer tubular portion.

5. The connector assembly of claim 4 wherein said outer tubular portion includes an inwardly directed section having inner and outer edges axially spaced from one another, said section adapted on said outer edge to cam said fingers radially inwardly as said clamping ring is inserted into said connector body and adapted on said inner edge to lock said clamping ring within said connector body.

6. An article for connecting to a length of tubing comprising:
   (a) an inner tubular member;
   (b) an outer tubular member coaxial with and surrounding said inner tubular member to define an annular space therebetween;
   (c) an annular partition within said annular space connected along its inner periphery to the outer surface of said inner member and along its outer periphery to the inner surface of said outer member; and
   (d) an inward facing flange at the open outer end of said outer tubular member defining with the outer end of said inner tubular member an annular passageway within said annular space adapted to receive a length of said tubing;

said article in combination with a collet member positionable at the outer end of said inner and outer tubular members and having a passageway through which a length of said tubing may pass;

said collet member having a plurality of resilient, flexible prongs spaced around and extending from the end of said collet member facing said inner and outer tubular members, each said prong terminating in an outward facing flange, said prongs insertable through said annular passageway into said annular space enabling said outward facing flanges of said prongs to lock to said inward facing flange of said outer tubular member, said prongs having a substantially blunt inner surface enabling said inner surface of said prongs to apply a compressive force upon said tubing, which has been engaged to said inner tubular member, against said inner tubular member, without causing said tubing to contact sharp edges;

said prongs sufficiently rigid to allow the insertion of said prongs to enable said engaged tubing to be forced into said annular space until a portion of said tubing is trapped between the prongs' ends and said partition; said prongs insertable into said annular space enabling said collet and said article to be arranged to enable a substantially linear compressive force, applied substantially parallel to the longitudinal axis of said outer tubular member, to engage said collet to said outer tubular member.

7. A connector assembly for connecting flexible tubing, said connector assembly comprising:
(a) an article for connecting lengths of flexible tubing comprising:
(1) a body member terminating at each end in a tubular member and defining a central passageway beginning within one of said tubular members, passing through said body member, and extending through the other said tubular member;
(2) a sleeve coaxially surrounding each said tubular member to define an annular space between each said sleeve and each said tubular member, the inner end of each said sleeve joined to said body member, an inwardly facing flange at the outer end of each said sleeve, each said flange defining with its respective said tubular member an annular passageway leading to said annular space defined by said sleeve; and
(b) a pair of collets, each collet positionable opposite the outer end of each said tubular member and adapted to fit around a length of said tubing; a plurality of resilient, flexible prong members attached to and distributed around the end of each said collet facing each said tubular member; an outward facing flange at the end of each said prong member, said prong members insertable through said annular passageway opposite said prong members into said annular space adjacent said annular passageway enabling said outwardly facing flanges of said prong members to interlock with said inwardly facing flange of said sleeve opposite said prong members, said prong members having a substantially blunt inner surface enabling said inner surface of said prongs to apply a compressive force upon said tubing, which has been engaged to said tubular member, against said tubular member, without causing said tubing to contact sharp edges; said prong members insertable into said annular space enabling said connector assembly to be arranged to enable a substantially linear compressive force, applied substantially parallel to the longitudinal axis of said sleeve, to engage said collets to said article.

8. The connector assembly of claim 7 in which said prongs are sufficiently rigid to allow the insertion of said prong members to enable said engaged tubing to be forced into said annular space until a portion of said tubing is trapped between the prongs' ends and said body member.

9. The connector assembly of claim 7 in which said prongs are sufficiently rigid to enable the insertion of said prong members to cause a substantially longitudinally directed extrusive force to be applied to said engaged tubing, said substantially longitudinally directed extrusive force stretching said engaged tubing toward said annular space and forcing a portion of said tubing to be trapped between the prongs' ends and said body member.

10. The connector assembly of claim 7 in which said body member is a straight member.

11. The connector assembly of claim 7 in which said body member is an elbow whose passageway begins at one end of said elbow, bends within said body member and terminates at the other end of said elbow.

12. The connector assembly of claim 7 in which said body member and said passageway are U-shaped.

13. The connector assembly of claim 7 in which the outside diameter of said inner tubular member gradually increases from its outer end toward its inner end.

14. The connector assembly of claim 7 in which said flexible tubing is prosthetic tubing.

15. The connector assembly of claim 7 in which said flexible tubing is silicone tubing.

16. The connector assembly of claim 7 in which said collets and said article are made of a polysulphone or acetal resin material.

* * * * *